United States Patent
Riddiford et al.

(10) Patent No.: US 9,193,369 B2
(45) Date of Patent: Nov. 24, 2015

(54) TWO-WHEELED TROLLEYS

(75) Inventors: Martin Philip Riddiford, London (GB); Shaun Alexander Hume, Tenterden (GB)

(73) Assignee: HandiWorld Ltd, London (GB)

( * ) Notice: Subject to any disclaimer, the term of this patent is extended or adjusted under 35 U.S.C. 154(b) by 0 days.

(21) Appl. No.: 14/240,940

(22) PCT Filed: Aug. 24, 2012 (Under 37 CFR 1.47)

(86) PCT No.: PCT/GB2012/000683
§ 371 (c)(1),
(2), (4) Date: Jun. 24, 2014

(87) PCT Pub. No.: WO2013/030521
PCT Pub. Date: Mar. 7, 2013

(65) Prior Publication Data
US 2015/0061239 A1 Mar. 5, 2015

(30) Foreign Application Priority Data
Aug. 26, 2011 (GB) .................................. 1114835.0

(51) Int. Cl.
*B62B 5/02* (2006.01)
*B62B 1/20* (2006.01)
(Continued)

(52) U.S. Cl.
CPC . *B62B 5/02* (2013.01); *B60B 19/00* (2013.01); *B60B 33/0052* (2013.01); *B60B 35/004* (2013.01); *B62B 1/02* (2013.01); *B62B 1/042* (2013.01); *B62B 1/208* (2013.01); *B60B 2200/43* (2013.01); *B60B 2200/47* (2013.01); *B60B 2900/551* (2013.01); *B62B 1/008* (2013.01); *B62B 2205/10* (2013.01);
(Continued)

(58) Field of Classification Search
CPC ........... B60B 19/14; B60G 3/00; B62D 57/00

USPC ........................................................ 280/5.28
See application file for complete search history.

(56) References Cited

U.S. PATENT DOCUMENTS

| | | | | |
|---|---|---|---|---|
| 1,572,531 | A | * | 2/1926 | Henkel ...................... 280/47.26 |
| 2,998,996 | A | * | 9/1961 | Aghnides ..................... 301/41.1 |
| 3,084,950 | A | | 4/1963 | Rass |
| 4,353,428 | A | | 10/1982 | Kovar et al. |
| 4,519,466 | A | * | 5/1985 | Shiraishi ........................ 180/7.1 |
| 6,158,762 | A | * | 12/2000 | Wong ............................ 280/652 |

(Continued)

FOREIGN PATENT DOCUMENTS

| | | | |
|---|---|---|---|
| DE | 201 14 287 | U1 | 12/2001 |
| FR | 669 952 | A | 11/1929 |

(Continued)

*Primary Examiner* — Tony Winner
*Assistant Examiner* — Michael Stabley
(74) *Attorney, Agent, or Firm* — Dicke, Billig & Czaja, PLLC

(57) ABSTRACT

The handling properties of two-wheeled trolleys may be materially improved by arranging for the freely rotatable wheels (1, 2) to be able to move to a certain extent relative to the frame or load-receiving container portions (3, 4, 5) of the trolley in a direction parallel to the direction of travel of the trolley. This can be achieved by mounting the trolley wheels (1, 2) so that they, and the axles (32) on which they are mounted for free rotation, can, preferably independently, swivel about a horizontal axis displaced from (and lower than) the level at which the wheels are mounted on their respective axles. The wheels are preferably set at a high positive camber angle. Letting the wheels swivel materially improves handling on rough terrain. The trolley is preferably foldable to save space when being transported or stored.

6 Claims, 5 Drawing Sheets

(51) Int. Cl.
    *B60B 19/00*     (2006.01)
    *B60B 33/00*     (2006.01)
    *B60B 35/00*     (2006.01)
    *B62B 1/02*     (2006.01)
    *B62B 1/04*     (2006.01)
    *B62B 1/00*     (2006.01)

(52) U.S. Cl.
    CPC ........ *B62B 2205/20* (2013.01); *B62B 2301/00* (2013.01); *B62B 2301/05* (2013.01); *B62B 2301/10* (2013.01); *B62B 2301/252* (2013.01); *Y10T 16/214* (2015.01)

(56) References Cited

U.S. PATENT DOCUMENTS

| | | | |
|---|---|---|---|
| 6,341,787 B1 * | 1/2002 | Mason | 280/47.26 |
| 6,543,559 B1 * | 4/2003 | Kaplun | 180/7.1 |
| 6,561,591 B2 * | 5/2003 | Zimet | 301/5.1 |
| 2009/0200773 A1 * | 8/2009 | Riddiford | 280/651 |

FOREIGN PATENT DOCUMENTS

| | | |
|---|---|---|
| GB | 948 603 A | 2/1964 |
| WO | 2009/098461 A1 | 8/2009 |
| WO | 2011/033301 A1 | 3/2011 |

\* cited by examiner

TWO-WHEELED TROLLEYS

This invention relates to two-wheeled trolleys. The term "trolley" is used herein to refer to a load-carrying apparatus having some sort of framework or container for supporting or receiving a load, and a pair of ground-engaging wheels.

Two-wheeled trolleys are known in a wide variety of embodiments, for example luggage trolleys, sack barrows, watercraft support trolleys and two-wheeled shopping trolleys.

Moving such a trolley and its load generally involves pulling or pushing the trolley by means of a suitable handle or handles forming part of it. This is usually easily achieved if the surface or terrain over which the trolley and its load is to be moved is relatively smooth or flat, and does not slope overall, but it becomes progressively more difficult as the terrain becomes rougher, either because it is naturally rough, such as a beach, sand dune area or the like, or because of man-made roughness, such as unevenly-laid paving or cobbles or steps, and this difficulty is increased if, in addition to the roughness, the terrain slopes.

One way of compensating for rough terrain is to increase the size of the two wheels. This is not always practical.

We have now found that the handling properties of two-wheeled trolleys may be materially improved by arranging for the freely rotatable wheels to be able to move to a certain extent relative to the frame or load-receiving container portions of the trolley in a direction parallel to the direction of travel of the trolley. This can be achieved by mounting the trolley wheels so that they, and the axles on which they are mounted for free rotation, can, preferably independently, swivel about a horizontal axis displaced from (and lower than) the level at which the wheels are mounted on their respective axles.

In a particularly preferred embodiment of the two-wheeled trolleys according to the present invention, the two wheels are mounted at a substantial positive camber angle to one another, i.e. when the trolley is being pulled or pushed along, the two wheels rotate about axles which are not horizontal, but rather outwardly downwardly inclined relative to the centre-line of the trolley. The camber angle is preferably at least 20° and more preferably at least 40°. Additionally, it is preferred that the wheels of the trolley are each in the form of a generally hemispherical exterior body having a central hub rather than a conventional wheel construction of a hub, spokes or disc, rim and tyre.

The limits to which each wheel may move in the direction of travel of the trolley, i.e. in a direction perpendicular to a notional line joining the centres of the two wheels, may be achieved by any convenient mechanism, for example mounting the wheels on arms which are themselves swivellably mounted to rotate about a horizontal axis, and with the swivel movement of the arms, i.e. the angular range about the horizontal axis within which the arms may move, being constrained by stops. Those stops may be part of the frame of the trolley or may be affixed to that frame, or form part of a load-receiving container attached to that frame.

Trolleys with hemispherical wheels are disclosed in WO 2009098461 and in WO 2011033301. In addition, U.S. Pat. No. 4,353,428 discloses the use of hemispherical wheels mounted so as to be swivellable as a whole about a horizontal axis, but only in the context of four-wheeled vehicles.

In preferred embodiments of trolleys according to the present invention, the two wheels are mounted on a framework which is movable from a deployed position in which the two wheels are spaced apart so that the distance between their points of contact with a horizontal flat supporting surface on which the trolley rests is at least 25 cm to a folded position in which the wheels are adjacent. If desired, the wheels may be dismountable from their respective axles to allow the framework to fold to an even more compact position to assist storage when the trolley is, for example, a beach cart which is designed to be folded to take up as little space as possible in the boot or trunk of a vehicle when not in use.

We have found that the handling properties of trolleys constructed in accordance with the invention are materially improved relative to prior known "fixed wheel" trolleys. The ability of the wheels to swivel independently provides a type of suspension effect which imparts a smoother ride to the trolley, thus reducing the risk of damage to anything it is carrying as well as making it much more comfortable to pull or push along. The customary vibration from the wheels is transmitted to the handle(s) moderated via the swivelling wheel arrangement.

Compared to known trolleys with spring suspensions associated with the wheels, there is a considerable increase in stability and reduced tendency for the entire trolley to tip sideways, e.g. if being pulled or pushed transversely to a slope. With a spring suspension trolley, there is a risk of the upper side of the trolley being bounced up sufficiently far that the whole trolley and its load tips down the slope.

The invention is illustrated by way of example with reference to the accompanying drawings in which.

Figure 1:
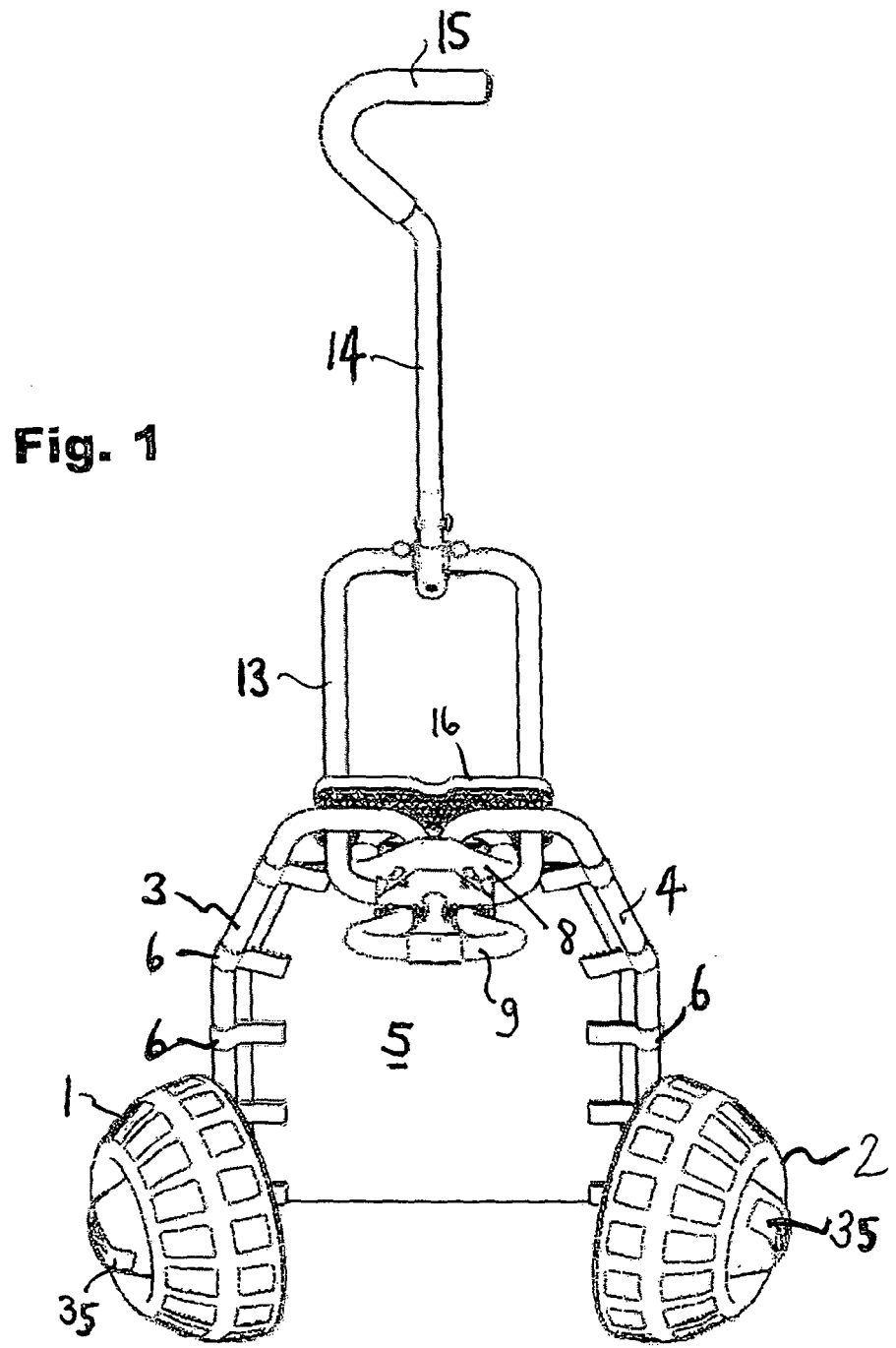
FIG. 1 is a diagrammatic rear view from below of a load-carrying trolley according to a preferred embodiment.
Figure 2:
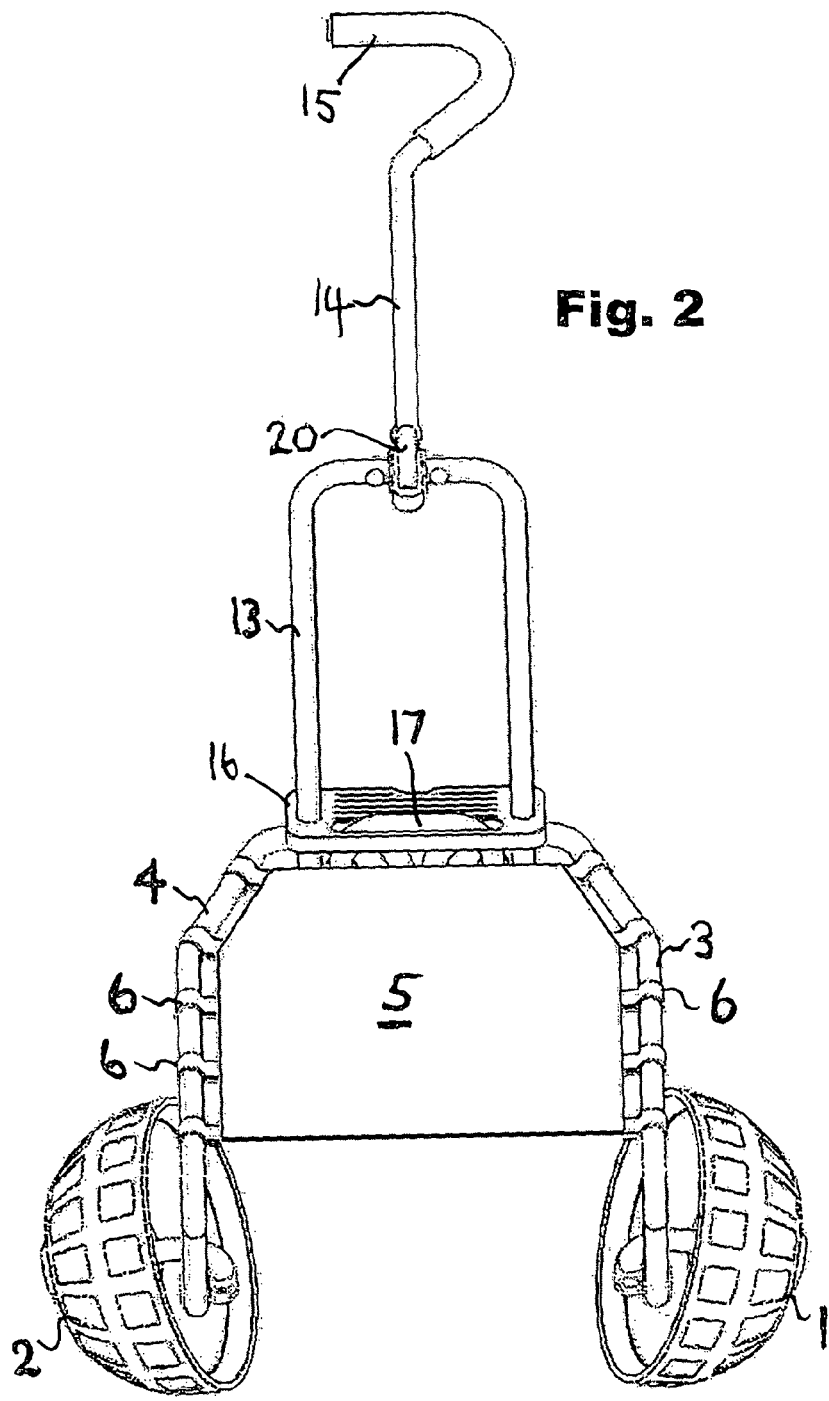
FIG. 2 is a front view from above of the trolley shown in FIG. 1.

Referring to the drawings, these show the overall construction and arrangement of a collapsible load-carrying trolley having two substantially hemispherical wheels 1, 2, each of which is mounted on the end of a side frame member 3, 4 respectively. The side frame members are spanned by a stout fabric sheet 5 attached at its edges by a series of short strips 6. In the deployed, i.e. not folded, position of the trolley shown in FIGS. 1 and 2 these constitute a relatively flat load-supporting surface. If desired, a strong support board may be provided to fit across the side frame members when carrying heavy loads. Such a board can be removed to enable the trolley to be folded, as explained below.

Figure 3:
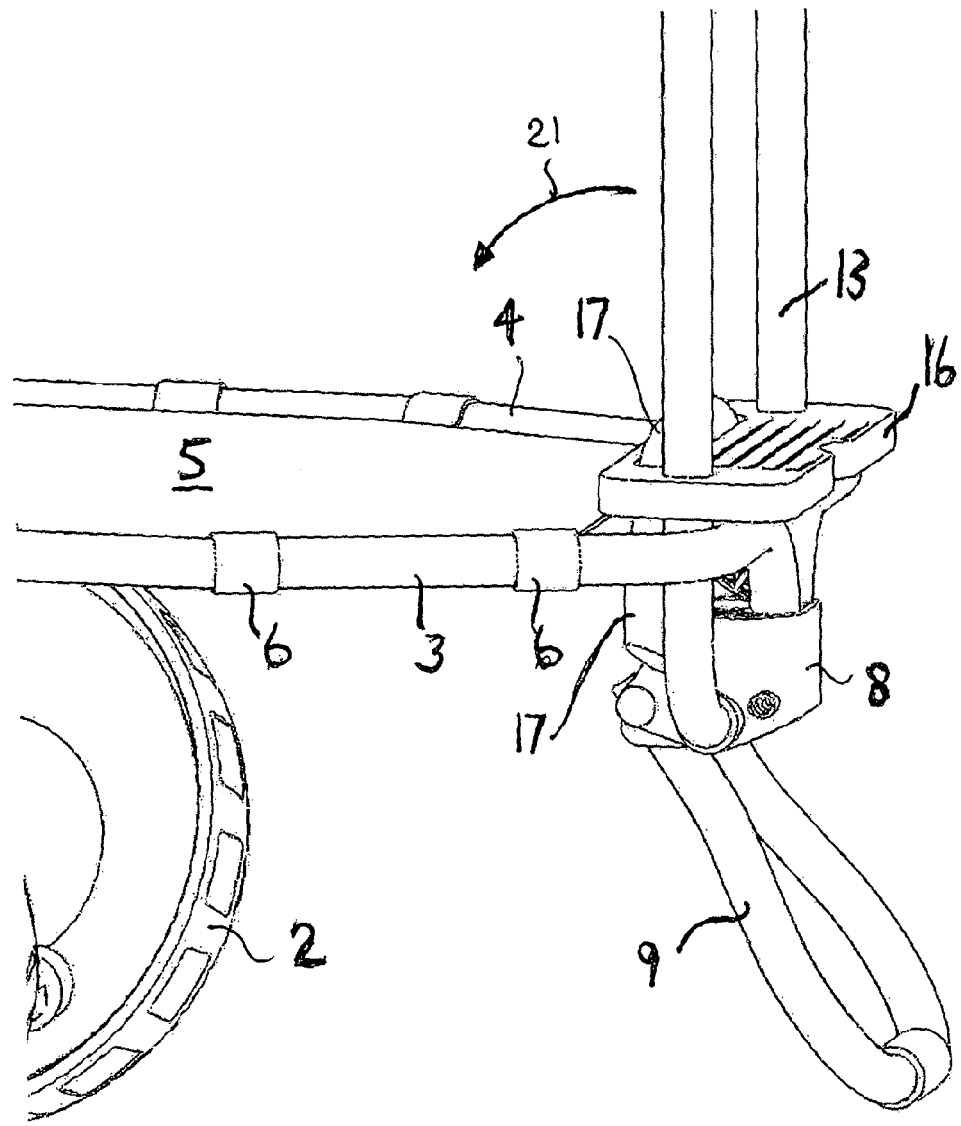
FIG. 3 is a side view on an enlarged scale of the handle mounting of the trolley of FIG. 1.

The rear ends of each of the side frame members 3, 4 remote from the wheels 1, 2 are bent down and set rotatably in a mounting block 8 shown in more detail in FIG. 3.

Mounting block 8 serves to support a kick stand 9 (shown in the deployed position in FIG. 3) and the lower part 13 of a handle for the trolley. Attached to the top of part 13 is a vertically extending handle upper part 14 terminating in a hand grip horizontal bar 15.

A sliding locking plate 16 is mounted on lower handle part 13. Plate 16 has a slot in its forward end which can fit over a hoop 17 fixed to block 8. By raising plate 16, handle part 13 may be swung in the direction indicated by arrow 21 on FIG. 3, rotating about its mountings at the side of block 8 to fold down and lie between the forward portions of side members 3 and 4.

A quick release catch 20 enables handle upper part 14 to be loosened relative to the upper horizontal section of lower part 14 so it can be folded down, after part 14 has been swung down to lie between the side frame members 3 and 4, to enable bar 15 to lie on top of block 8.

Figure 4:
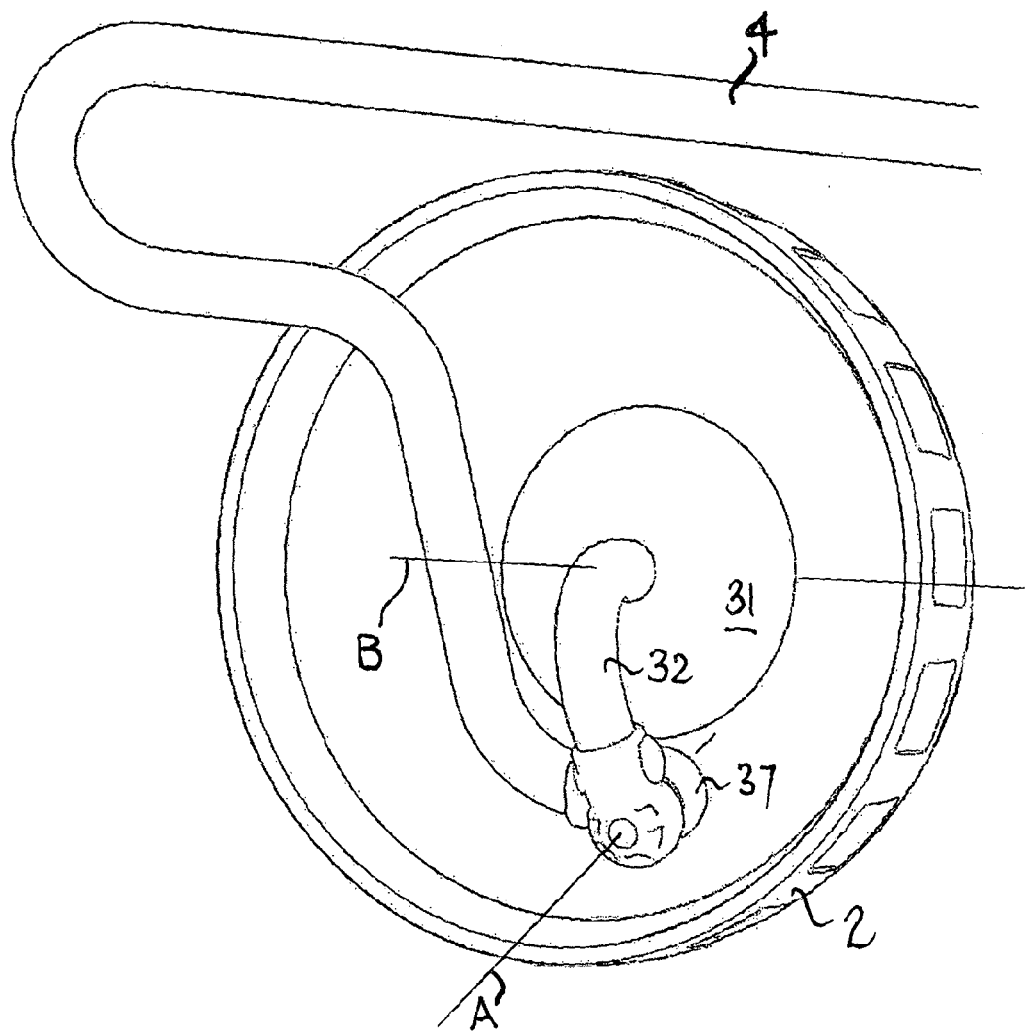
FIG. 4 is a perspective view on an enlarged scale of one of the trolley wheels.

The wheels 1 and 2 are attached to the side members 3, 4 via a swivelling connection as shown in more detail in FIG. 4. Each hemispherical wheel 1, 2 has a hub portion 31 into which a stub axle portion of an angled axle 32 extends. The wheel can accordingly rotate about an axis of rotation denoted B in FIGS. 4 and 5. The stub axle portion has a terminal plug 33 with a groove 34 which can be engaged by a key-hole shaped aperture in a retaining clip 35 fitted into the hub, so enabling the wheels to be detached for storage if desired.

Figure 5:
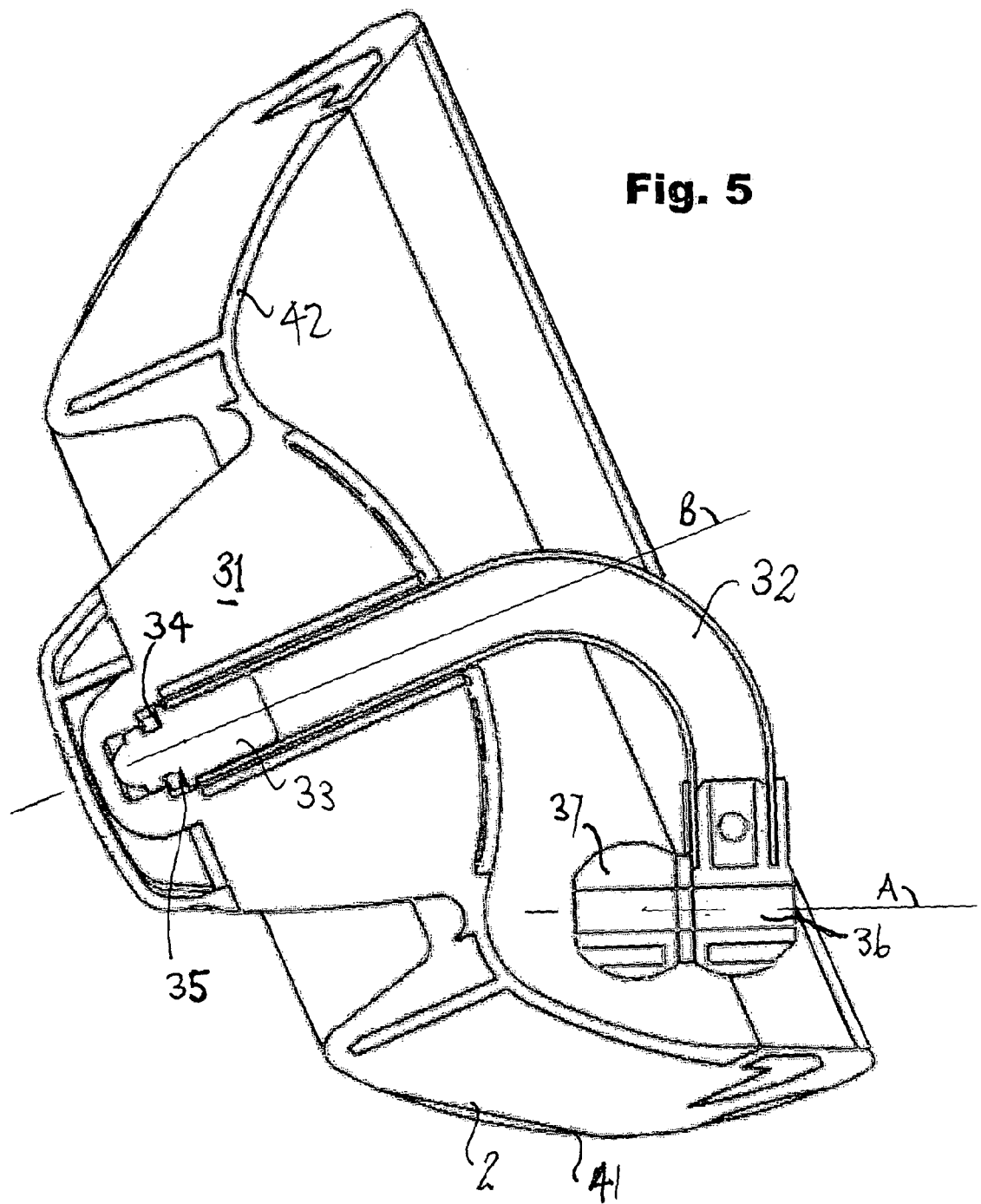
FIG. 5 is a more detailed sectional drawing showing how the trolley wheel is constructed and mounted.

The end of angled axle 32 remote from the stub axle portion is fixed to a rotatable shaft which is mounted on the end of side frame member 3, 4 enabling axle 32 to rotate about an axis denoted A in FIGS. 4 and 5.

This mechanism enables the wheels of the trolley to swivel about horizontal axis A as shown in FIGS. 4 and 5, each wheel being able to swivel about the axis A independently of the other. This enables the trolley to be walked up or down stairs or over rough ground with considerable ease.

The degree to which each wheel can swivel about the horizontal axis A at the base end of the side members 3 and 4 will depend on the specific geometry, in particular the angular range between the point at which part of the inner edge of the wheel abuts part of the frame member 3 or 4 and the point where the angled axle 32 comes into contact with member 3 or 4. Although as shown angled axles 32 are mounted on the inner sides of members 4, they can, if appropriately shaped, be mounted on the outer sides.

FIG. 5 shows the wheel structure in detail. The wheel itself has an outer part-spherical running surface 41, which may have a tread on or in it. This is integrally formed with a generally conical disc 42, the narrow end of which carries the hub 31 into which a the angled axle 32 penetrates. Each angled axle 32 rotates on a stub shaft 36, which is set in a bearing 37 on the end of the frame members 3 and 4 of the trolley.

As illustrated in the Figures, the wheels on the trolley are at a substantial camber angle. This is not always convenient, and the present invention includes analogous structures where the axes of the wheel axles are essentially horizontal but they can swivel about a (lower) horizontal axis between the end of the wheel hub and the ground on which the wheel rests.

The invention claimed is:

1. A two-wheeled trolley comprising a box or frame structure adapted to receive or support a load, and two ground-engaging wheels mounted for free rotation on axles connected to the box or frame structure wherein the axles can themselves swivel over a restricted arcuate range relative to the box or frame structure, about a horizontal axis perpendicular to the direction of travel when the trolley is pulled or pushed along; in which each axle is J-shaped such that each wheel is mounted to a long end of the J-shaped axle for free rotation around a first axis defined by the long end, and a short end of the J-shaped axle is mounted to the structure perpendicularly to, and for free rotation around, the horizontal axis.

2. A trolley according to claim 1 wherein each axle is capable of swivelling independently of the other.

3. A trolley according to claim 1 wherein the axles on which the two wheels rotate are coplanar when in a vertical plane and inclined at 75° to 105° to one another, and each axle is mounted on the box or frame structure in a fashion allowing it to pivot relative thereto about an axis substantially parallel to the ground on which the wheels rest.

4. A trolley according to claim 3 and including two wheel and mounting units, each consisting of a wheel mounted on a stub shaft for rotation about a first axis, the stub shaft being mounted at or near one end of a crank or radius arm, and the crank or radius arm being rotatable about a second axis at or near its other end, the two axes being at an angle of at least 30°, preferably 35° to 55°.

5. A trolley according to claim 4 wherein the axis around which the crank or radius arm rotates lies between the edge of the wheel where it contacts the ground and the end of the hub from which the stub axle emerges.

6. A trolley according to claim 1 wherein the wheels are supported on a framework foldable from and deployable to an extended load-supporting arrangement.

\* \* \* \* \*